March 12, 1929.  W. G. DUNHAM  1,705,243
METHOD FOR DETERMINING THE RELATIVE POSITION
OF OBJECTS AND DEVICES SUITABLE THEREFOR
Filed Nov. 22, 1927  4 Sheets-Sheet 1

INVENTOR
William G. Dunham
BY
ATTORNEY

March 12, 1929.  W. G. DUNHAM  1,705,243
METHOD FOR DETERMINING THE RELATIVE POSITION
OF OBJECTS AND DEVICES SUITABLE THEREFOR
Filed Nov. 22, 1927   4 Sheets-Sheet 4

Patented Mar. 12, 1929.

1,705,243

UNITED STATES PATENT OFFICE.

WILLIAM G. DUNHAM, OF NEW YORK, N. Y.

METHOD FOR DETERMINING THE RELATIVE POSITION OF OBJECTS AND DEVICES SUITABLE THEREFOR.

Application filed November 22, 1927. Serial No. 235,027.

My invention relates to position determining devices and methods for their employment and refers particularly to devices for determining the relative position of moving objects.

One of the objects of my invention is a device whereby the relative positions of two moving objects may be determined when those objects are not visible one from the other.

Another object of my invention is a device whereby the direction of movement of an invisible device may be determined.

Devices of the character of that of my invention are particularly valuable in the determination of the position and movement of two moving vessels when they are invisible to each other because of fog, and I will describe its application for that purpose, without limiting its use to vessels.

The two essential elements to be determined with respect to two moving vessels invisible to each other, are the relative positions of the two vessels and their direction of movement.

The determination of these two facts will indicate the probability of collision and warn the respective parties of the means necessary to prevent a possible meeting of the vessels.

Because sound penetrates fog more efficiently than does light, I will describe my invention with sound signals although not limited to that particular warning signal.

My device is of such construction that it will advise another vessel within hearing distance of their relative position and the direction being followed by the device-bearing vessel, thus allowing the other vessel to steer its course accordingly.

The many novel and useful attributes of my device will be evident upon a consideration of my specification and its accompanying drawings.

In the accompanying drawings comprising modified forms of the device of my invention, similar parts are indicated by similar numerals.

Figure 1:
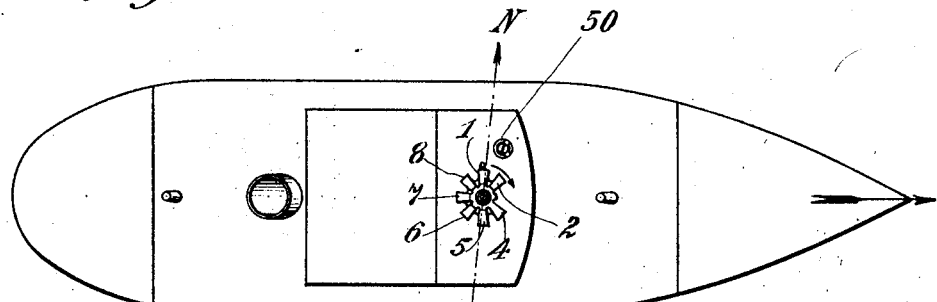
Figure 1 is a top view of a vessel carrying my device.

The particular form of the device of my invention illustrated in the accompanying drawings comprises two supports 10, 10, pivotally supporting the outer gimbal 11 at 12, 12, the latter being pivotally attached to the inner gimbal 13 at 14, 14. The lower portion 15 of the gimbal 13 is enlarged in order that it retain the mechanism carried by the gimbal arms 16, 16 in vertical and level position.

Fixedly attached to the gimbal arms 16, 16 is a cylindrical horn support 17 carrying the horns 1, 2, 4, 5, 6, 7 and 8, each horn having a passage into the interior of the horn support 17. It is to be noted that the corresponding horn between horns 2 and 4 is absent, and that its passage into the horn support 17 is closed by the plug 18.

Within the horn support 17 and revoluble therein is the sound producing member 19 which has an opening, or passage 20, the upper portion of which is capable of placement in alignment with the horn passages, and the lower portion of which contains a sound producing device 21 capable of making a sound when air, or steam is forced therethrough. The annular packing rings 22, 22 are recessed within the sound producing member 19, thus allowing easy revolution of the latter but preventing leakage of the air, or steam between the members 17 and 19.

Vertical movement of the member 19 is prevented by the cover-plate 71 and the lower ring 72.

The valve support 23 is carried by the sound producing member 19, and has a vertical passage 24, the lower extremity 25 of the valve support 23 being enlarged and having a spherical recess 26 therein.

Revoluble within the recess 26 is a ball joint 27, having a passage 28 therethrough, the upper portion of said passage being flared for purposes described later.

A flexible pipe 29 is fixedly attached to the lower portion of the ball joint 27 and the upper portion of the base 30, the latter having a passage 31, which is connected by means of the pipe 32 to a steam source, not shown.

The central portion 33 of the valve support 23 has an enlarged annular horizontal passage 34 within which is a revoluble cylindrical valve 35 having a passage 36 therethrough.

A link movement consists of the link 37 fixedly attached to the extended member 38 of the valve 35 and pivotally atached at 39 to the link 40. The link 40 is pivotally attached to the arm 41 of the link 42 at 43. One end of the link 42 is pivotally attached to the member 23 at 44 and the other end carries the handle 45.

The link 42 carries a spring 46, the resiliency of which causes it to support and removably retain the link 42 within one of the recesses 47, 47 of the flange 48 of the horn support 17.

The operation of the device is as follows:—

The device is bolted to the deck of a vessel with the plug 18 pointing in the direction of the bow.

Figure 3:
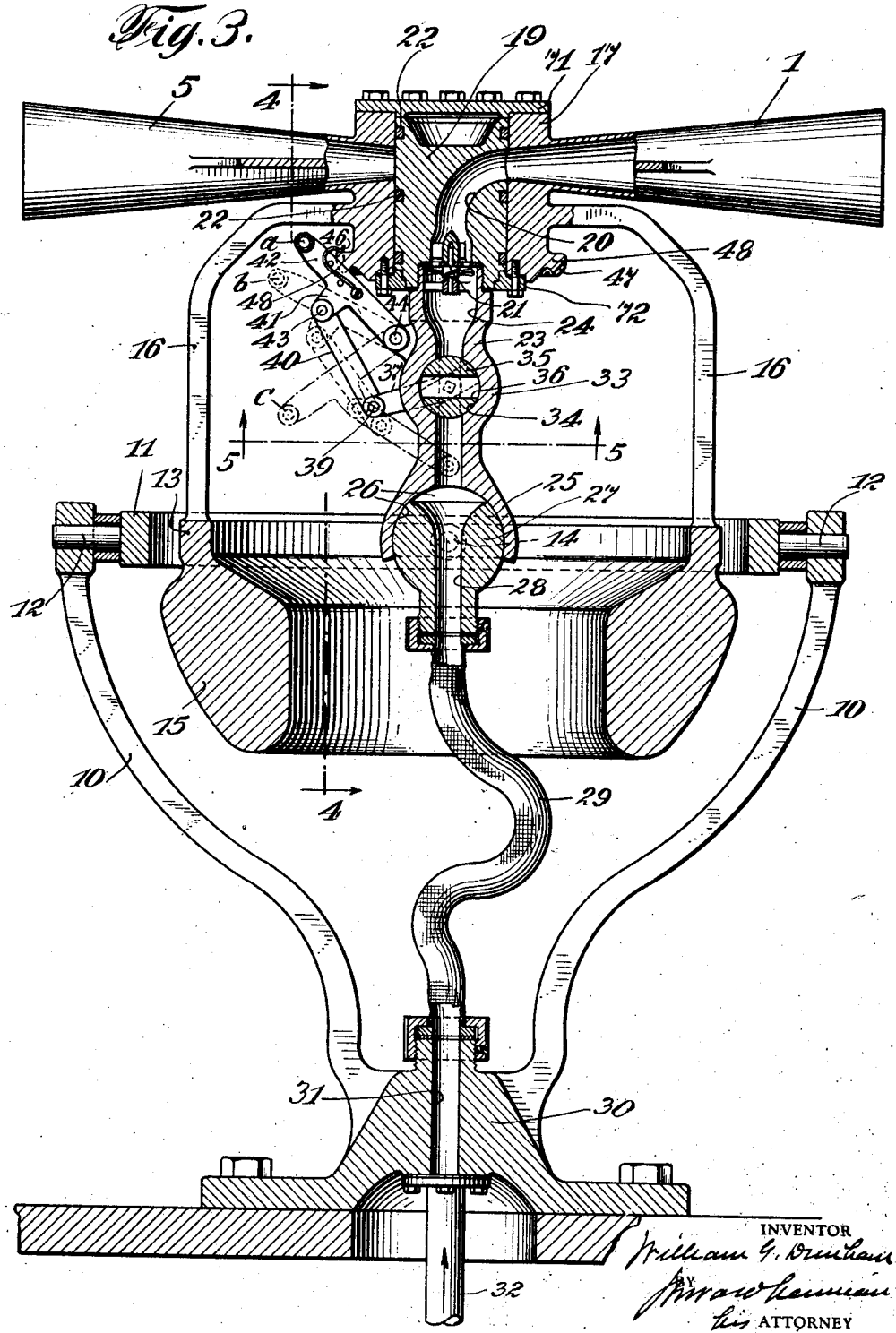
Figure 3 is a section through the line 3—3 of Figure 2.
Figure 4:
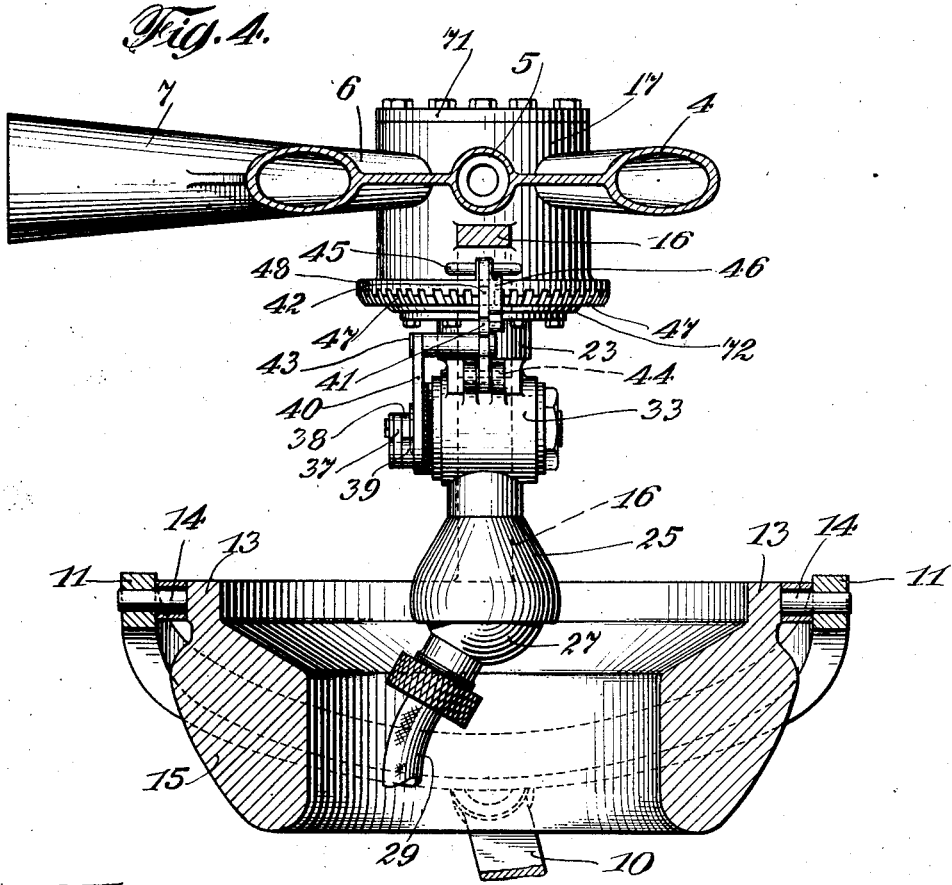
Figure 4 is a section through the line 4—4 of Figure 3.
Figure 5:
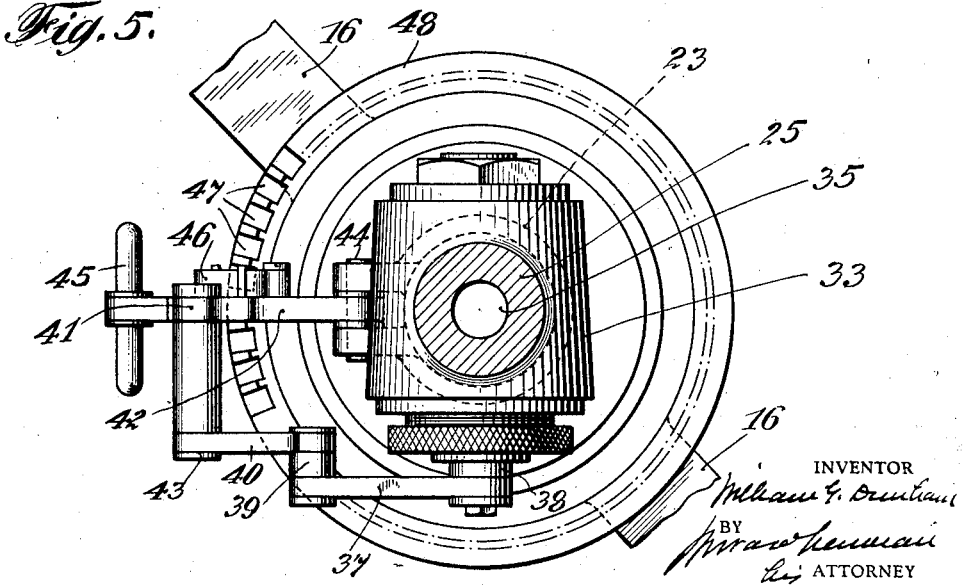
Figure 5 is a section through the line 5—5 of Figure 3.

The link 42 is pressed downwardly from position A to position B (Figure 3) which releases the link 42 from the recesses and revolves the valve 35 a short distance but not sufficiently to place the passages 24 and 36 in alignment and hence the horns are silent.

By means of the compass 50 (Figure 1) the horn pointing most nearly northerly is determined and the link 42 moved horizontally until the upper end of the passage 20 is in alignment with the opening in the northerly horn.

The link 42 is then pressed downwardly to position C (Figure 3) thus opening the valve 34, and the steam entering through the pipe 32, will pass through the device and sound the most northerly horn.

The link 42 is now moved clock-wise in a horizontal circle thus sound each of the horns successively.

Figure 2:
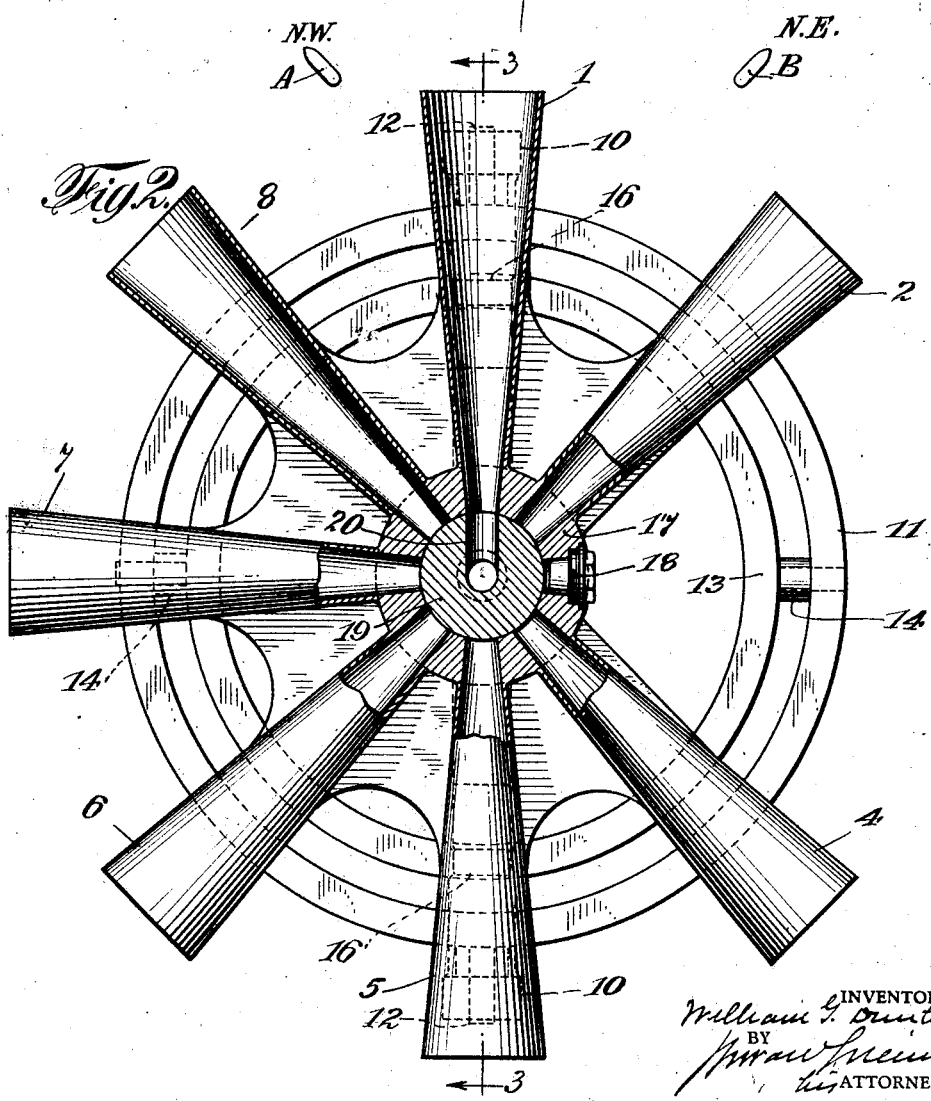
Figure 2 is an enlarged top view of my device as thereon in Figure 1, partly broken away for purposes of clearness of description.

It is to be noted (see Figure 2) that the diameter of the upper end of the passage 20 is slightly greater than the distance between the horn openings, so that there will not always be a silence between the horn, but the sound will be a succession of loud and low sounds, the high sound being incident with the complete alignment of the passage 20 and a horn opening. It will be noted that there will be a dead silence between the horns upon each side of the plug 18.

When a complete circuit of the horns has been made, the revolution is interrupted for a short time and then repeated, horn corrections being made each time in order that the sound will commence with the most northerly horn.

The following are given as examples of the application of my system of sound information and my device:—

Vessel A (Figure 1) is moving in a northwesterly direction. The sounds heard upon vessel A if my device were on the larger vessel would be two blasts followed by a silence and then a series of sounds the third one of which would be the loudest. The silence after the second blast would indicate that the vessel was moving in an easterly direction and the third sound after the silence being the loudest would indicate that the vessel was north-east of vessel A, and hence there would be no liability of collision.

Vessel B (Figure 1) is moving in a northeasterly direction and the sounds heard thereon would be two blasts followed by a silence and the first horn after the silence would be the loudest. The vessel would, therefore, be north-west of vessel A and moving easterly and hence there would be a strong liability of collision.

Figure 7:
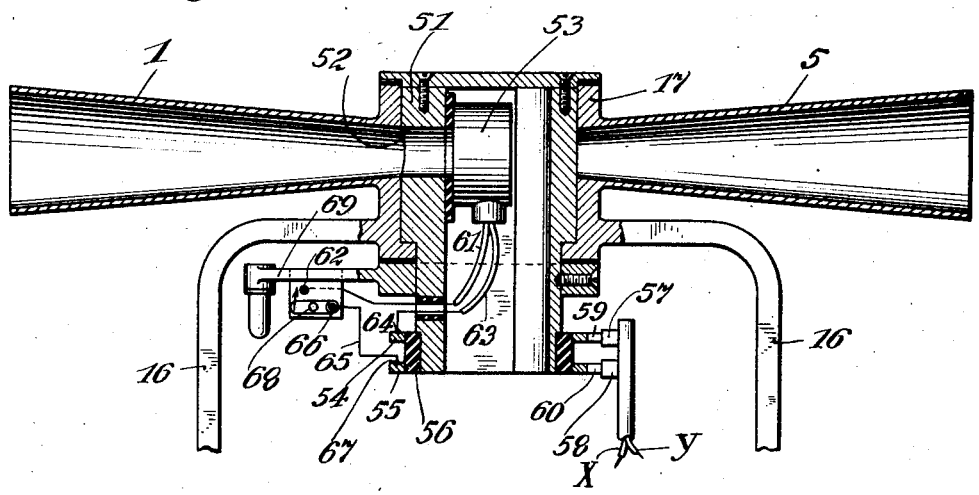
Figure 7 is a section through the line 7—7 of Figure 6.
Figure 6:
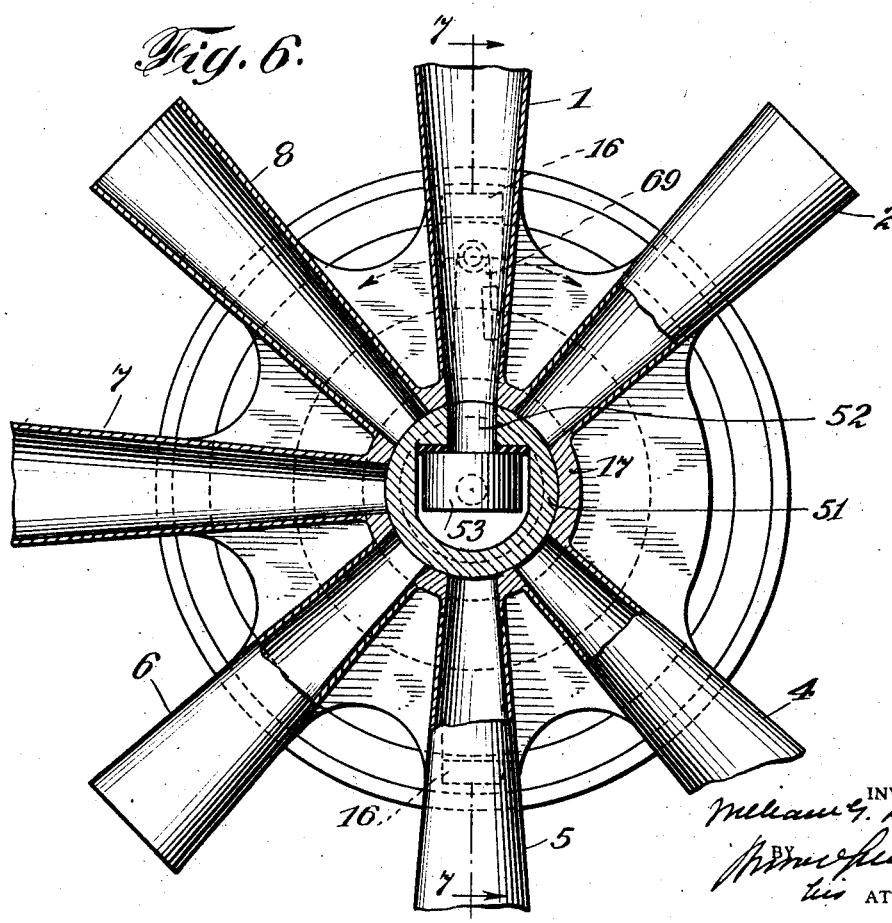
Figure 6 is a top view of a modified form of my device electrically operated.

The device of my invention shown in Figures 1 to 5, inclusive, is an air or steam operated warning signal, while the modification shown in Figures 6 and 7 is electrically operated. In this form of my device the revoluble member 51 has a passage 52 therethrough and carries an electrically operated sound producer 53. The lower portion member 51 carries the two flanges 54 and 55 of electric conductivity, separated from the member 51 by the insulator 56. The two electric wires X and Y are connected to the binding posts 57 and 58, which carries the metallic tongues 59 and 60 abutting upon the flanges 54 and 55.

The wire 61 of the sound box 53 is connected to the binding post 62, and the wire 63 of the sound box 53 is connected to the binding post 64 of the flange 54. A wire 65 connects the binding post 66 to the binding post 67 of the flange 55. A make-and-break switch 68 is capable of co-acting with the posts 62 and 66. A handle 69 is carried by the member 51.

In operation, the switch 68 is placed in open position and the sound producing mechanism is revolved until the passage 52 abuts upon the passage in the most northerly horn, the blank space between the horns 2 and 4 being in fixed position toward the bow of the vessel. The switch 68 is then closed and the sound producing mechanism is revolved clockwise by means of the handle.

The operation of the electrically operated device is similar to that of the steam operated device previously described.

As one of the objects of my invention is a device in which the northerly horn will be differentiated from the other horns and in which the relationship of the direction of the movement of the ship with respect to the northerly horn is to be indicated, it is evident that other indicating means may be employed.

The northerly horn, for instance, may have a different sound from the other horns, or the direction of movement of the ship may be indicated by a horn of different sound from the other horns, instead of by a period of silence as illustrated. Other changes of discrimination and indication can be made without going beyond the scope of my invention.

When I refer to "signals" in my specification and claims, I mean designating indications, whether they be audible or silent.

I do not limit myself to the particular, size, shape, character, number or arrangement of parts as shown and described as these are given simply as a means for clearly describing my invention.

What I claim is:—

1. In a position-determining device suitable for adaptation to moving objects, in combination, a plurality of radiating position-determining signalling elements fixedly attached to a moving object with one signalling element directed in the direction of the moving object, means for operating the signalling elements in succession and means for determining the initial element to be so operated.

2. In a position-determining device suitable for adaptation to moving objects, in combination, a plurality of radiating non-revoluble position-determining signalling elements, means whereby one of said position determining elements may be differentiated from the other elements when operated and revoluble means whereby said elements may be operated in succession.

3. In a position-determining device suitable for adaptation to moving objects, in combination, a plurality of radiating non-revoluble position-determining signalling elements, means whereby one of said position-determining elements may be differentiated from the other elements when operated, revoluble means whereby said elements may be operated in succession and means for determining the initial element to be so operated.

4. In a position-determining device suitable for adaptation to moving objects, in combination, a plurality of radiating horns, one of which can be audibly differentiated from the other horns, means for sounding the horns in succession and means for determining the initial horn to be so sounded.

5. In a position-determining device suitable for adaptation to moving objects, in combination, a plurality of non-revoluble horns one of which can be audibly differentiated from the other horns and revoluble means for sounding the horns in succession.

6. In a position-determining device suitable for adaptation to moving objects, in combination, a plurality of radiating horns at equi-distance from each other one horn being replaced by a non-soundable element and means for sounding the horns in succession.

7. In a position-determining device suitable for adaptation to moving objects, in combination, a plurality of non-revoluble radiating horns at equi-distance from each other one horn being replaced by a non-soundable element and revoluble means for sounding the horns in succession.

8. In a position-determining device suitable for adaptation to moving objects, in combination, a plurality of radiating horns at equi-distance from each other one horn being replaced by a non-soundable element, means for sounding the horns in succession and means for determining the initial horn to be sounded.

9. In a position-determining device suitable for adaptation to moving objects, in combination, a plurality of position-determining signalling elements, means for maintaining the signalling elements in horizontal position, means for positioning one of the signalling devices in the direction of movement of the moving object to which the device is attached and means for operating the signalling elements in succession.

10. In a position-determining device suitable for adaptation to moving objects, in combination, a plurality of radiating position-determining signalling elements fixedly attached to a moving object with one signalling element directed in the direction of the moving object, means for maintaining the signalling elements in horizontal position, means for operating the signalling elements in succession and means for determining the initial element to be so operated.

11. In a position-determining device suitable for adaptation to moving objects, in combination, a plurality of radiating non-revoluble position-determining signalling elements, means whereby one of said position-determining elements may be differentiated from the other elements when operated, means for maintaining the signalling elements in horizontal position, revoluble means whereby said elements may be operated in succession and means for determining the initial element to be so operated.

12. In a position-determining device suitable for adaptation to moving objects, in combination, a plurality of radiating horns, one of which can be audibly differentiated from the other horns, means for maintaining the horns in horizontal position, means for sounding the horns in succession and means for determining the initial horn to be so sounded.

13. In a position-determining device suitable for adaptation to moving objects, in combination, a plurality of radiating horns at equi-distance from each other one horn being replaced by a non-soundable element, means for maintaining the horns in horizontal position and means for sounding the horns in succession.

14. In a position-determining device suitable for adaptation to moving objects, in combination, a plurality of non-revoluble radiating horns at equi-distance from each other one horn being replaced by a non-soundable element, means for maintaining the horns in horizontal position and revoluble means for sounding the horns in succession.

15. In a method for determining the position of a moving object with respect to another object, the steps which comprise operating a signal designating a predetermined compass direction, operating signals designating other predetermining compass directions, the signal designating the direction of the moving object carrying the device being distinguishable from the other signals.

16. In a method for determining the position of a moving object with respect to another object, the steps which comprise sounding a plurality of horns carried by the moving object, one of the horn soundings being distinguishable from the other horn soundings when pointed in a predetermined compass direction and means indicating the direction of movement of the moving object.

Signed at New York city in the county of New York and State of New York this 18th day of November, 1927.

WILLIAM G. DUNHAM.